(12) United States Patent
Aoki et al.

(10) Patent No.: US 11,046,210 B2
(45) Date of Patent: Jun. 29, 2021

(54) SLIDE DEVICE

(71) Applicant: SHIROKI CORPORATION, Fujisawa (JP)

(72) Inventors: Shunsuke Aoki, Fujisawa (JP); Takanori Sato, Kariya (JP); Koji Kumagai, Kariya (JP)

(73) Assignee: SHIROKI CORPORATION, Fujisawa (JP)

(*) Notice: Subject to any disclaimer, the term of this patent is extended or adjusted under 35 U.S.C. 154(b) by 0 days.

(21) Appl. No.: 16/817,771

(22) Filed: Mar. 13, 2020

(65) Prior Publication Data

US 2020/0324670 A1    Oct. 15, 2020

(30) Foreign Application Priority Data

Apr. 15, 2019   (JP) .............................. JP2019-077404

(51) Int. Cl.
  *B60N 2/07*   (2006.01)
  *B60N 2/08*   (2006.01)
(52) U.S. Cl.
  CPC ......... *B60N 2/0812* (2013.01); *B60N 2/0725* (2013.01); *B60N 2/0727* (2013.01)

(58) Field of Classification Search
  CPC ...... F16C 29/02; F16C 29/04; F16C 2326/06; B60N 2/0725; B60N 2/0818; B60N 2/0825; B60N 2/0843
  See application file for complete search history.

(56) References Cited

U.S. PATENT DOCUMENTS

| | | | |
|---|---|---|---|
| 9,162,596 B2 * | 10/2015 | Kato | B60N 2/0705 |
| 10,076,974 B2 * | 9/2018 | Hill | B60N 2/522 |
| 2008/0048476 A1 * | 2/2008 | Kojima | B60N 2/0818 |
| | | | 297/341 |
| 2011/0024595 A1 * | 2/2011 | Oi | B60N 2/0843 |
| | | | 248/429 |

FOREIGN PATENT DOCUMENTS

JP          2009248697 A       10/2009

* cited by examiner

*Primary Examiner* — Phillip A Johnson
(74) *Attorney, Agent, or Firm* — Buchanan Ingersoll & Rooney PC

(57) ABSTRACT

A slide device includes a lower rail, an upper rail, a lock member, and a lock release member. The upper rail is coupled to the lower rail in a movable manner. The lock member is configured to restrict movement of the upper rail relative to the lower rail. The lock release member is configured to release a lock by the lock member. The lock release member includes a bracket fixed to the upper rail. A cover is attached to the bracket.

2 Claims, 11 Drawing Sheets

SLIDE DEVICE

BACKGROUND

1. Field

The following description relates to a slide device in which an upper rail slides relative to a lower rail.

2. Description of Related Art

Japanese Laid-Open Patent Publication No. 2009-248697 describes a slide device in which an upper rail slides relative to a lower rail. The slide device includes a lock member that restricts movement of the upper rail relative to the lower rail, and a lock release member that releases a lock of the lock member.

SUMMARY

With the slide device of the above publication, a member may come into contact with the lock release member in an undesirable manner. One objective of the present disclosure is to provide a slide device that protects a lock release member in a preferred manner.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a slide device includes a lower rail, an upper rail, a lock member, and a lock release member. The upper rail is coupled to the lower rail in a movable manner. The lock member restricts movement of the upper rail relative to the lower rail. The lock release member releases a lock of the lock member. The lock release member includes a bracket fixed to the upper rail. A cover is attached to the bracket.

In this structure, the cover is attached to the bracket that is fixed on the upper rail. This prevents a member from coming into contact with the lock release member. Thus, the lock release member is readily protected in a preferred manner. Further, the bracket fixed on the upper rail is used as a member to which the cover is attached. This allows for further stable attachment of the cover.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
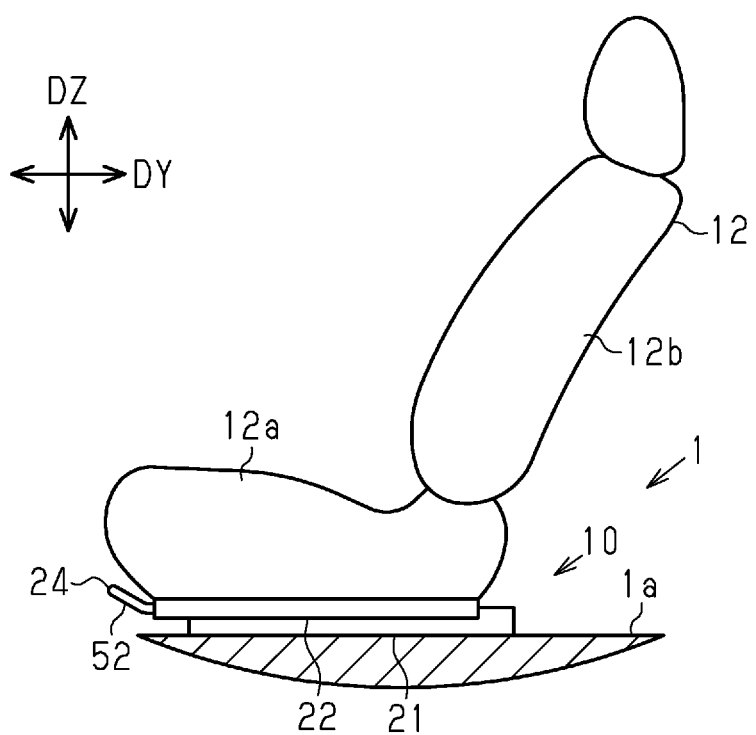
FIG. 1 is a schematic diagram of a seat slide device.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A slide device 10 will now be described with reference to FIGS. 1 to 13. The slide device 10 is a component of a seat slide device 1. The seat slide device 1 includes two slide devices 10 and slidably supports a seat 12 on the two slide devices 10. The seat 12 includes a seat cushion 12a and a backrest 12b that is pivotally coupled to the seat cushion 12a.

Figure 2:
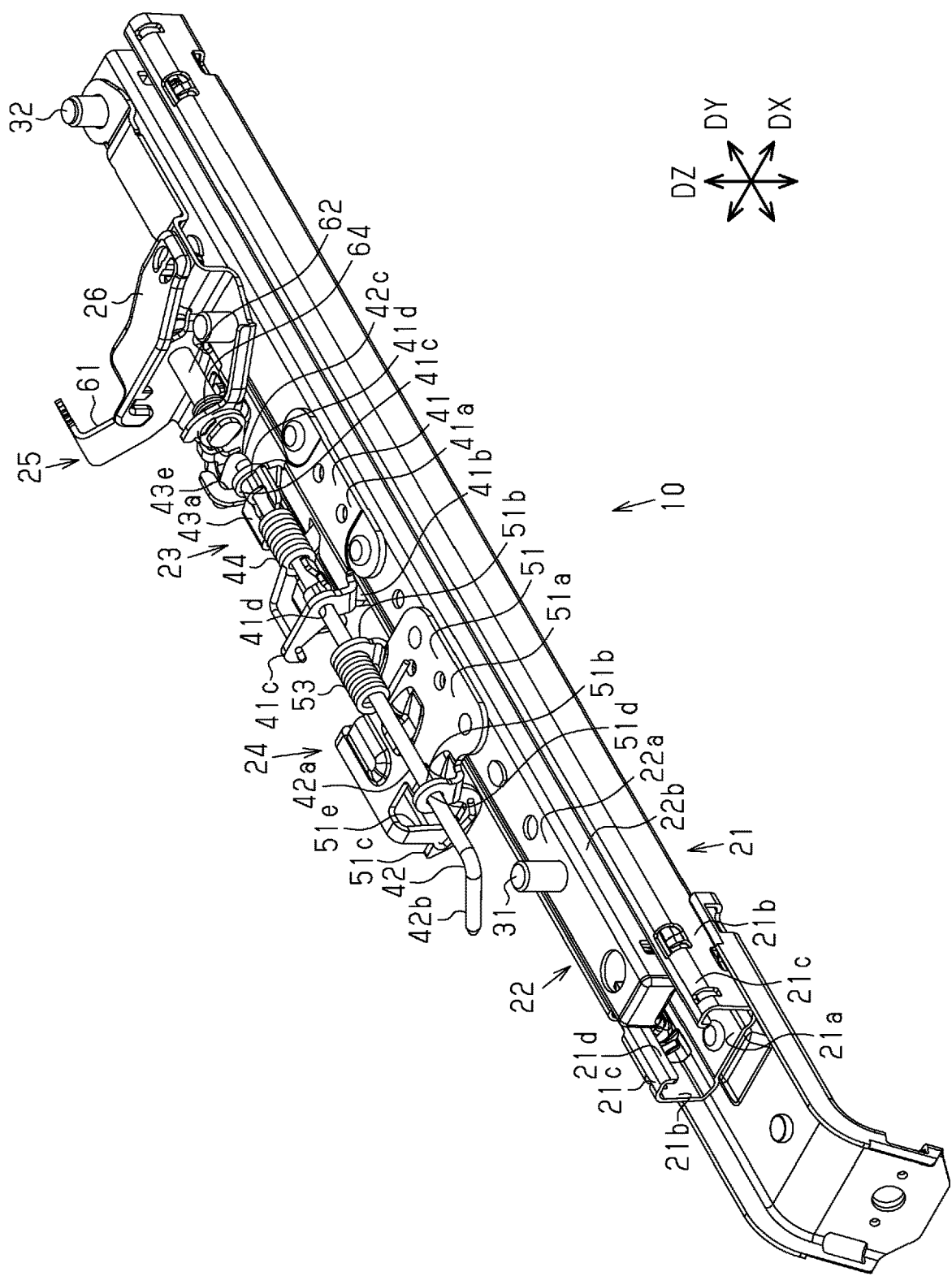
FIG. 2 is a perspective view of a slide device.

As shown in FIGS. 1 and 2, each slide device 10 includes a lower rail 21, an upper rail 22, a lock mechanism 23 serving as a lock member, a front release mechanism 24 serving as a lock release member, and a rear release mechanism 25 also serving as a lock release member. In other words, the seat slide device 1 includes two lower rails 21, two upper rails 22, two lock mechanisms 23 serving as lock members, two front release mechanisms 24 serving as lock release members, and two rear release mechanisms 25 also serving as lock release members. A cover 26 is attached to each rear release mechanism 25.

In a state in which the slide device 10 is set on a floor 1a of a vehicle, a direction extending in a front-rear direction of the vehicle will be referred to as "front-rear direction DY", a direction extending in a widthwise direction of the vehicle will be referred to as "widthwise direction DX", and a direction extending in a top-bottom direction of the vehicle will be referred to as "top-bottom direction DZ". When faced toward the front of the vehicle, leftward will be referred to as leftward with respect to the widthwise direction DX, and rightward will be referred to as rightward with respect to the widthwise direction DX.

The front-rear direction DY of the slide device 10 coincides with a longitudinal direction of the lower rail 21 and the upper rail 22 of each slide device 10. Further, the top-bottom direction DZ is orthogonal to each of the front-rear direction DY and the widthwise direction DX.

The lower rail 21, the upper rail 22, the lock mechanism 23, the front release mechanism 24, the rear release mechanism 25, and the cover 26 at the left side with respect to the widthwise direction DX will now be described. The lower rail 21, the upper rail 22, the lock mechanism 23, the front release mechanism 24, the rear release mechanism 25, and the cover 26 at the right side with respect to the widthwise direction DX are shaped symmetrically.

The lower rail 21 will now be described.

As shown in FIG. 2, the lower rail 21 is coupled to the vehicle floor in the front-rear direction DY. The two lower rails 21 are spaced apart from each other in the widthwise direction DX.

Figure 5:
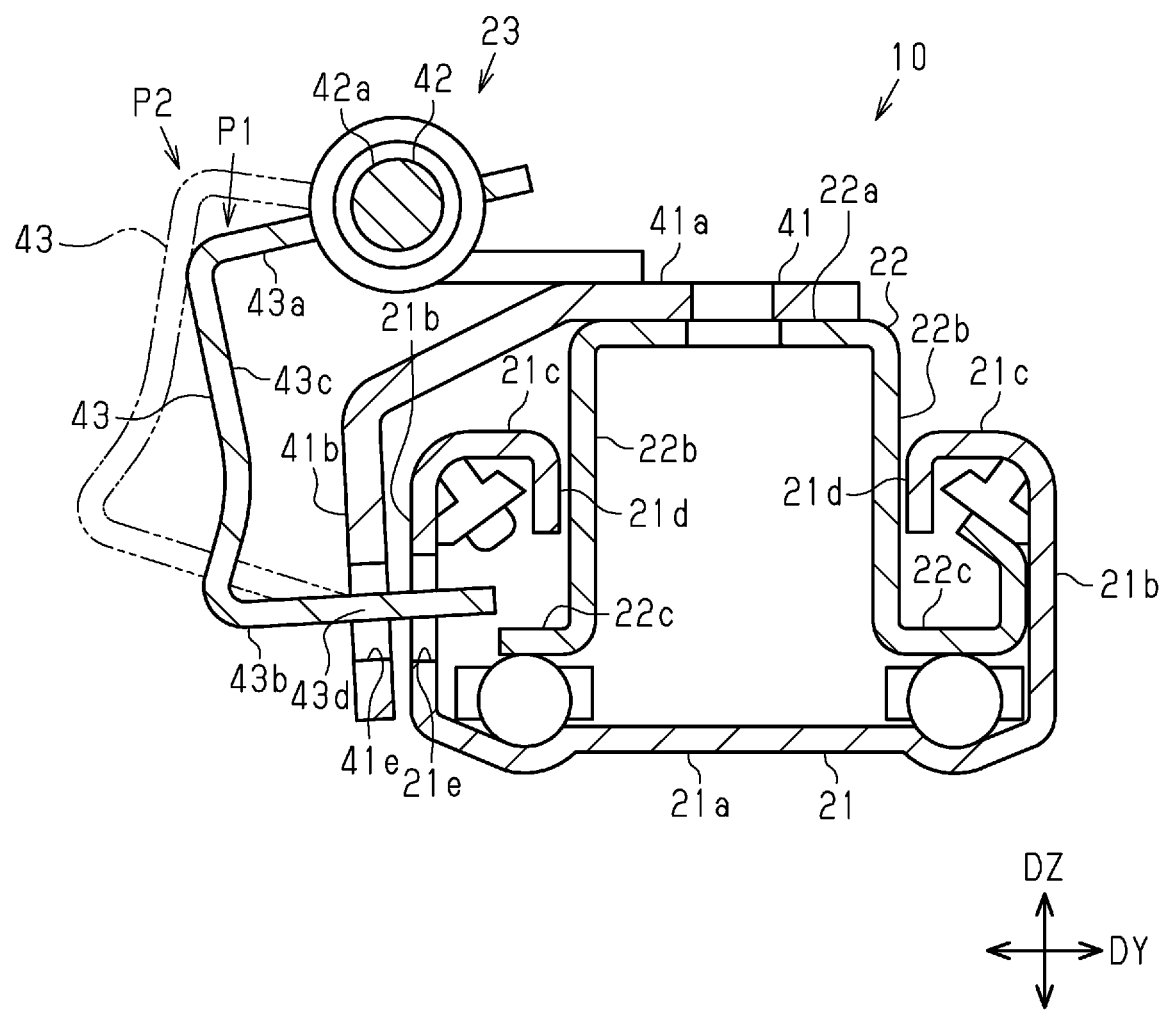
FIG. 5 is a cross-sectional view of a lock mechanism.

As shown in FIG. 5, the lower rail 21 has a substantially C-shaped cross section and is formed by bending a sheet of metal. The lower rail 21 includes a bottom wall 21a, two outer walls 21b, two connecting walls 21c, and two inner walls 21d.

The bottom wall 21a is a plate portion extending on a plane of the vehicle floor in the front-rear direction DY. The two outer walls 21b extend upward in the top-bottom direction DZ from two ends of the bottom wall 21a in the widthwise direction DX. The two inner walls 21d are located between the two outer walls 21b and extend in the top-bottom direction DZ. In the widthwise direction DX, the two inner walls 21d are spaced apart from each other and also spaced apart from the two outer walls 21b. Each connecting wall 21c connects an upper end of the corresponding outer wall 21b and an upper end of the corresponding inner wall 21d. The lower end of each inner wall 21d is spaced apart from the bottom wall 21a.

Figure 4:
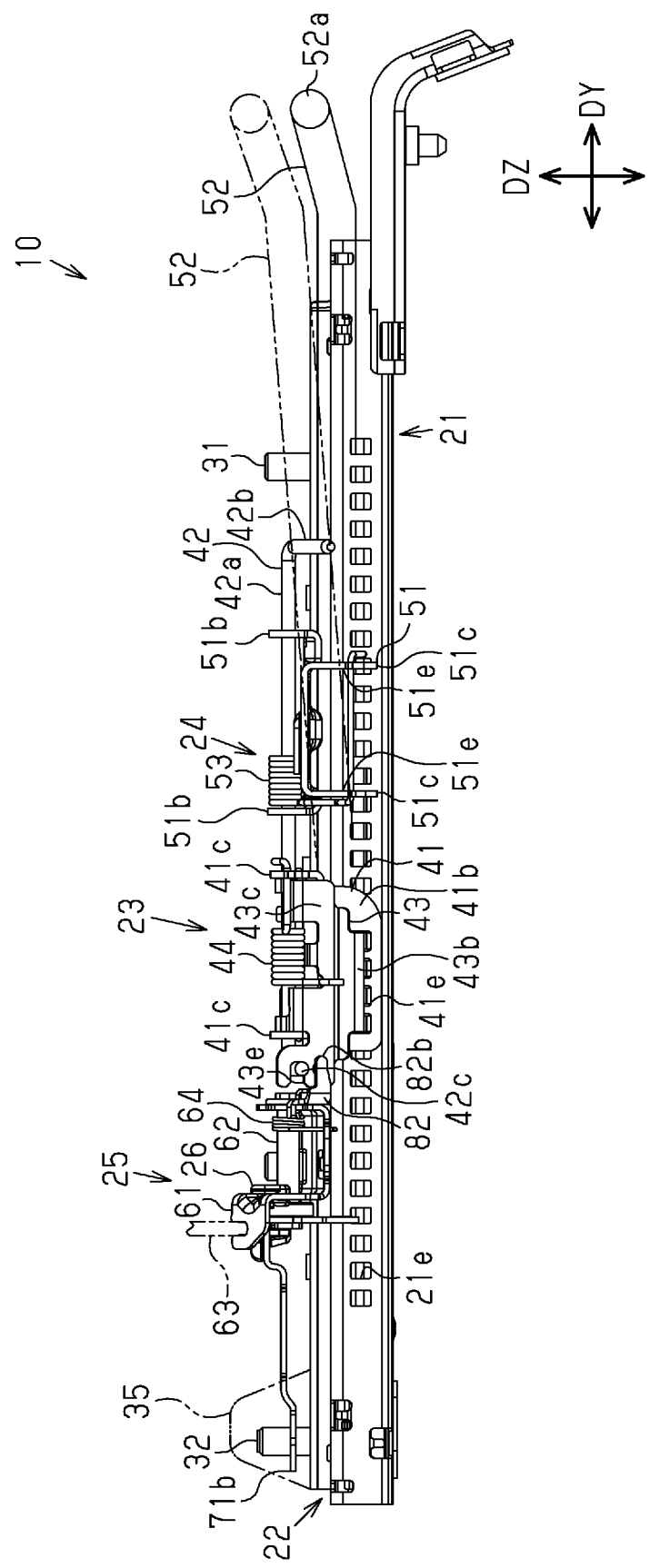
FIG. 4 is a side view of the slide device.

As shown in FIG. 4, one of the two outer walls 21b includes a plurality of lock holes 21e. The outer wall 21b including the lock holes 21e in the lower rail 21 is located at a position faced toward the outer wall 21b including the lock holes 21e in the other lower rail 21. The lock holes 21e are arranged at substantially equal intervals in the front-rear direction DY.

The upper rail 22 will now be described.

As shown in FIG. 2, the upper rail 22 extends in the front-rear direction DY and is coupled to the lower rail 21 in a slidable manner relative to the lower rail 21 in the front-rear direction DY.

As shown in FIG. 5, the upper rail 22 is formed by bending a sheet of metal. The upper rail 22 includes an upper wall 22a, two insertion walls 22b, and two bent walls 22c. The upper wall 22a is a plate portion extending parallel to the plane of the vehicle floor in the front-rear direction DY. The upper wall 22a is located upward from the lower rail 21. In the cross section of FIG. 5, the two insertion walls 22b extend downward in the top-bottom direction DZ from the two ends of the upper wall 22a in the widthwise direction DX.

The two insertion walls 22b are inserted in a space between the two inner walls 21d of the lower rail 21. Each bent wall 22c is bent at a lower end of the insertion wall 22b and extends basically toward the corresponding connecting wall 21c of the lower rail 21. The bent wall 22c is disposed inside the lower rail 21, for example, between the corresponding outer wall 21b and inner wall 21d.

One of the two bent walls 22c includes a plurality of lock grooves (not shown in the drawing). The bent wall 22c including the lock grooves in the upper rail 22 is located at a position faced toward the bent wall 22c including the lock grooves in the other upper rail 22. Each lock groove is a cutout that opens in an upper edge of the bent wall 22c and extends downward. The lock grooves are arranged at substantially equal intervals in the front-rear direction DY. The intervals of the lock grooves are substantially the same as the intervals of the lock holes 21e of the lower rail 21.

Figure 3:
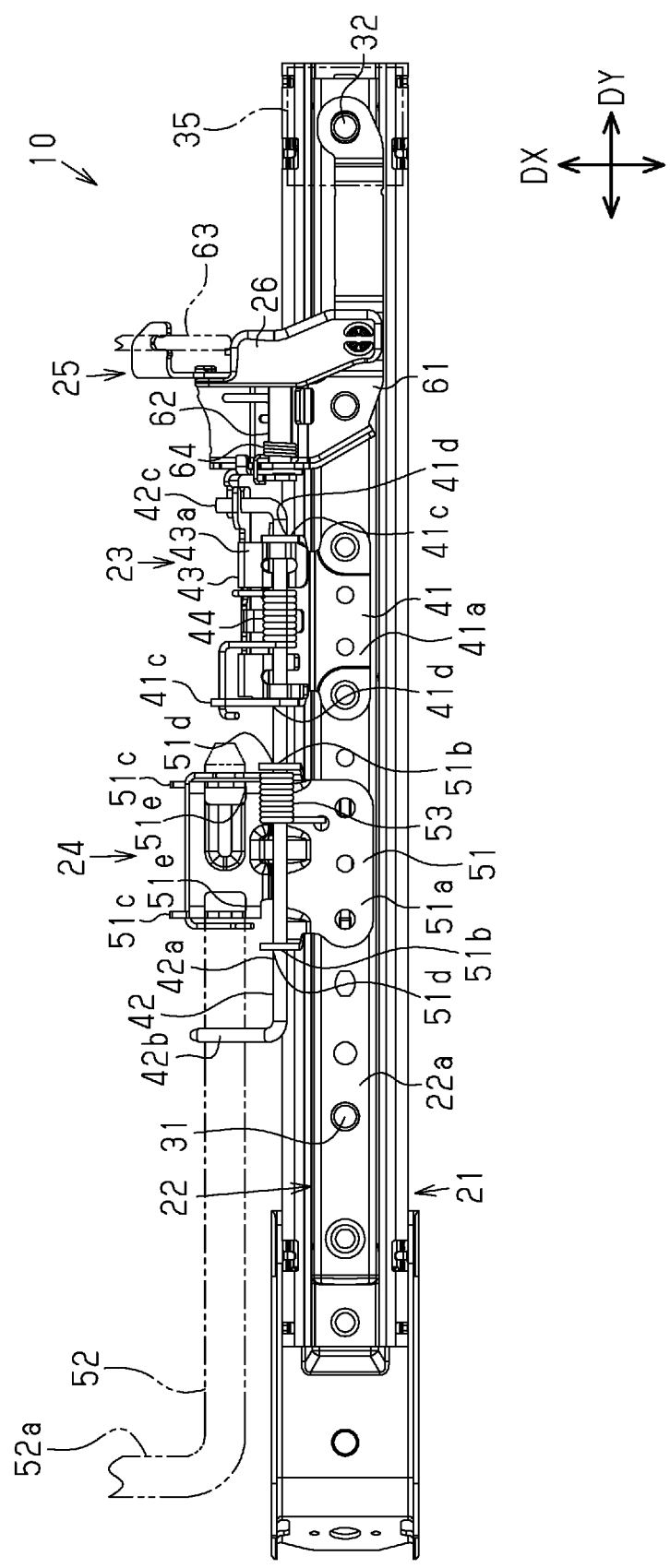
FIG. 3 is a plan view of the slide device.

As shown in FIG. 3, the upper wall 22a includes a front bolt 31 and a rear bolt 32. The front bolt 31 and the rear bolt 32 project upward from the upper wall 22a in the top-bottom direction DZ. The front bolt 31 is located at a front edge of the upper wall 22a in the front-rear direction DY. The rear bolt 32 is located at a rear edge of the upper wall 22a in the front-rear direction DY. In the present embodiment, "edge" includes, in addition to an edge of a member or an edge of a portion, a portion near the corresponding edge.

The seat cushion 12a shown in FIG. 1 is disposed on the upper wall 22a. The front bolt 31 and the rear bolt 32 are fixed to, for example, a frame of the seat cushion 12a. The frame of the seat cushion 12a may be part of a seat lifter, which is configured to move the seat cushion 12a in the top-bottom direction DZ and tilt the seat cushion 12a. Further, an anchor bracket 35 is arranged at a rear end of the upper wall 22a. The anchor bracket 35 is coupled to, for example, the rear bolt 32 or the upper wall 22a near the rear bolt 32. In this manner, the anchor bracket 35 is located on the upper wall 22a.

A belt anchor (not shown) is coupled to the anchor bracket 35. For example, the belt anchor is coupled to the anchor bracket 35 by a coupling bolt in a manner rotatable about a rotation center extending in the widthwise direction DX.

The lock mechanism 23 serving as a lock member will now be described.

As shown in FIGS. 2 to 4, the lock mechanism 23 includes a lock lever bracket 41, an open rod 42, a lock lever 43, and a first spring 44.

As shown in FIG. 2, the lock lever bracket 41 includes a coupling wall 41a, a covering wall 41b, and two support walls 41c. The coupling wall 41a is coupled to the upper wall 22a between the front bolt 31 and the rear bolt 32 by, for example, bolts.

As shown in FIG. 5, the covering wall 41b extends downward from one end of the coupling wall 41a to cover part of the outer wall 21b.

As shown in FIG. 2, the two support walls 41c project substantially upward from the two ends of the coupling wall 41a in the front-rear direction DY. The two support walls 41c each include a support hole 41d.

As shown in FIG. 5, the covering wall 41b includes a plurality of insertion holes 41e. The insertion holes 41e are arranged at substantially equal intervals in the front-rear direction DY. The intervals of the insertion holes 41e are substantially the same as the intervals of the lock holes 21e and the intervals of the lock grooves. Thus, the insertion holes 41e can be aligned with and connected to the lock holes 21e and the lock grooves.

As shown in FIG. 3, the open rod 42 includes a shaft portion 42a, a front bent portion 42b, and a rear bent portion 42c. The shaft portion 42a extends substantially straight in the front-rear direction DY and is inserted through the support holes 41d. Each support wall 41c of the lock lever bracket 41 supports the shaft portion 42a rotatably about a first rotation center. Each support wall 41c supports the shaft portion 42a at a position separated from the upper rail 22 in the widthwise direction DX.

The first rotation center is the hypothetical center axis of the shaft portion 42a and extends between the two ends of the shaft portion 42a. The first rotation center extends in the front-rear direction DY.

The front bent portion 42b extends in a direction substantially orthogonal to the first rotation center from one end of the shaft portion 42a in the front-rear direction DY. The rear bent portion 42c extends in a direction substantially orthogonal to the first rotation center from the other end of the shaft portion 42a in the front-rear direction DY. The front bent portion 42b and the rear bent portion 42c substantially extend in the widthwise direction DX.

As shown in FIG. 5, the lock lever 43 includes an upper wall 43a, a lower wall 43b, and a middle wall 43c. The upper wall 43a is located above the coupling wall 41a of the lock lever bracket 41. The lower wall 43b includes teeth 43d. The middle wall 43c connects the upper wall 43a and the lower wall 43b.

Each tooth 43d extends toward the insertion holes 41e of the lock lever bracket 41. The teeth 43d are arranged at substantially equal intervals in the front-rear direction DY. The intervals of the teeth 43d are substantially the same as the intervals of the insertion holes 41e, the lock holes 21e, and the lock grooves.

The upper wall 43a is located between the two support walls 41c of the lock lever bracket 41. The upper wall 43a is attached to the shaft portion 42a of the open rod 42. For example, the upper wall 43a includes a portion extending across the upper side of the shaft portion 42a and a portion extending across the lower side of the shaft portion 42a. The upper wall 43a elastically sandwiches the shaft portion 42a with these portions.

As shown in FIG. 4, part of the middle wall 43c projects rearward from the rear one of the support walls 41c in the front-rear direction DY. The part of the middle wall 43c projecting rearward from the rear one of the support walls 41c includes an engagement groove 43e. The engagement groove 43e is a cutout extending frontward in the front-rear direction DY from the rear end of the middle wall 43c in the front-rear direction DY The rear bent portion 42c of the open rod 42 is fitted in the engagement groove 43e. This allows rotation (torque) to be transmitted between the open rod 42 and the lock lever 43.

As shown in FIG. 5, the lock lever 43 is movable to a lock position P1 and an unlock position P2, which is indicated by the double-dashed lines. In the present embodiment, the lock lever 43 is pivoted about the first rotation center between the lock position P1 and the unlock position P2. At the lock position P1, the teeth 43d of the lock lever 43 are fitted into the insertion holes 41e, the lock holes 21e, and the lock grooves. Thus, the lock lever 43 at the lock position P1 locks the lower rail 21 and the upper rail 22 to restrict relative movement of the lower rail 21 and the upper rail 22.

At the unlock position P2, the teeth 43d of the lock lever 43 are located outside the insertion holes 41e, the lock holes 21e, and the lock grooves. Thus, the lock lever 43 at the unlock position P2 unlocks and releases the lower rail 21 and the upper rail 22 to permit relative movement of the lower rail 21 and the upper rail 22.

The front release mechanism 24 serving as a lock release member will now be described.

As shown in FIGS. 2 to 4, the front release mechanism 24 includes an open lever bracket 51, an open lever 52, a second spring 53, and the open rod 42.

The open lever bracket 51 includes a coupling wall 51a, two support walls 51b, and two holding walls 51c. The coupling wall 51a is coupled to the upper wall 22a between the front bolt 31 and the lock lever bracket 41 by, for example, bolts. The two support walls 51b project substantially upward in the top-bottom direction DZ from two ends of the coupling wall 51a in the front-rear direction DY. The two support walls 51b each include a support hole 51d.

The shaft portion 42a of the open rod 42 is inserted through the support holes 51d. Each support wall 51b of the open lever bracket 51 supports the shaft portion 42a rotatably about the first rotation center.

The two holding walls 51c project substantially downward from the coupling wall 51a at positions separated from each other in the front-rear direction DY. Each holding wall 51c is located at a position separated from the upper rail 22 and the support walls 51b in the widthwise direction DX. The two holding walls 51c each include a holding hole 51e.

The open lever 52 is inserted through the holding holes 51e and held by the holding walls 51c. The open lever 52 is located in front of the lock lever 43 in the front-rear direction DY. For example, the open lever 52 includes a handle 52a extending toward the front from the open lever bracket 51 in the front-rear direction DY The handle 52a also extends toward the front from the lock lever 43 in the front-rear direction DY. The handle 52a is a portion extending in the widthwise direction DX and connecting the open lever 52 of one of the front release mechanisms 24 with the open lever 52 of the other one of two front release mechanisms 24.

The front bent portion 42b of the open rod 42 contacts the open lever 52 in front of the open lever bracket 51 in the front-rear direction DY. The front bent portion 42b is located on the open lever 52.

As indicated by the double-dashed lines in FIG. 4, the open lever 52 is pivotal about a rotation center extending in the widthwise direction DX, for example, when the handle 52a is lifted. The rotation center may be moved when the open lever 52 is pivoted. Each holding hole 51e is elongated in the top-bottom direction DZ to permit pivoting of the open lever 52.

Pivoting of the open rod 42 also pivots the lock lever 43 about the first rotation center from the lock position P1 to the unlock position P2. In this manner, the open lever 52 pivots the open rod 42 to move the lock lever 43 to the unlock position P2. Thus, the front release mechanism 24 unlocks and releases the upper rail 22 and the lower rail 21 from the lock mechanism 23 when the handle 52a, which is operable from the front of the seat 12, is operated.

The rear release mechanism 25 serving as the lock release member will now be described.

Figure 6:
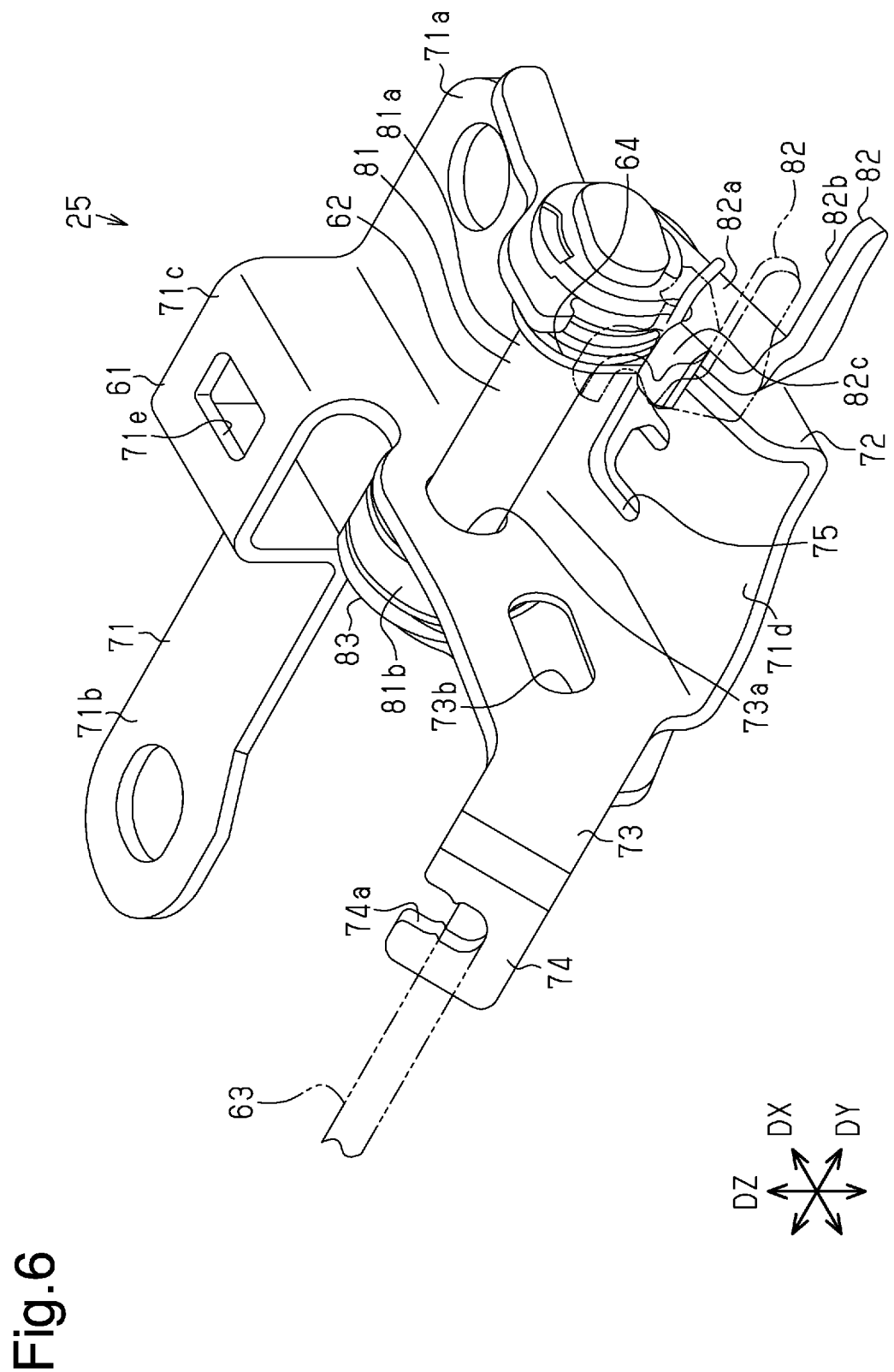
FIG. 6 is a perspective view of a rear release mechanism without a cover.

As shown in FIG. 6, the rear release mechanism 25 includes an open shaft bracket 61, an open shaft 62, a cable 63, and a third spring 64. The open shaft bracket 61 includes a coupling wall 71, a first support wall 72, a second support wall 73, and a holding wall 74.

The coupling wall 71 is located in the front-rear direction DY between the lock lever bracket 41 and the rear end of the upper rail 22 in the front-rear direction DY. The coupling wall 71 includes a front coupling portion 71a, a rear coupling portion 71b, a projection 71c, and an extension portion 71d.

The front coupling portion 71a is coupled to the upper wall 22a by a bolt. The rear coupling portion 71b extends toward the rear from the front coupling portion 71a in the front-rear direction DY and is coupled to the upper wall 22a by, for example, the rear bolt 32. In this manner, the open shaft bracket 61 is coupled to the upper rail 22.

The front coupling portion 71a and the rear coupling portion 71b couple the rear release mechanism 25 to the upper rail 22 at positions rearward from the lock mechanism 23 in the front-rear direction DY. Thus, the open shaft bracket 61, the open shaft 62, the cable 63, and the third spring 64 are located, for example, rearward from the lock lever 43 in the front-rear direction DY. Alternatively, the rear release mechanism 25 may include a portion located frontward from the lock lever 43 in the front-rear direction DY as long as the rear release mechanism 25 includes a portion located rearward from the lock lever 43 in the front-rear direction DY.

The projection 71c is part of the coupling wall 71 and located between the front coupling portion 71a and the rear coupling portion 71b. The projection 71c is bent to project upward in the top-bottom direction DZ. The projection 71c is bent, for example, to avoid a component projecting from the upper wall 22a. The projection 71c includes a second opening 71e that is engaged with a second engagement portion of the cover 26, which will be described later.

The extension portion 71d projects substantially rightward in the widthwise direction DX from the front coupling portion 71a. The extension portion 71d includes a groove 75. The first support wall 72 projects substantially upward from an end of the extension portion 71d in the front-rear direction DY.

Figure 7:
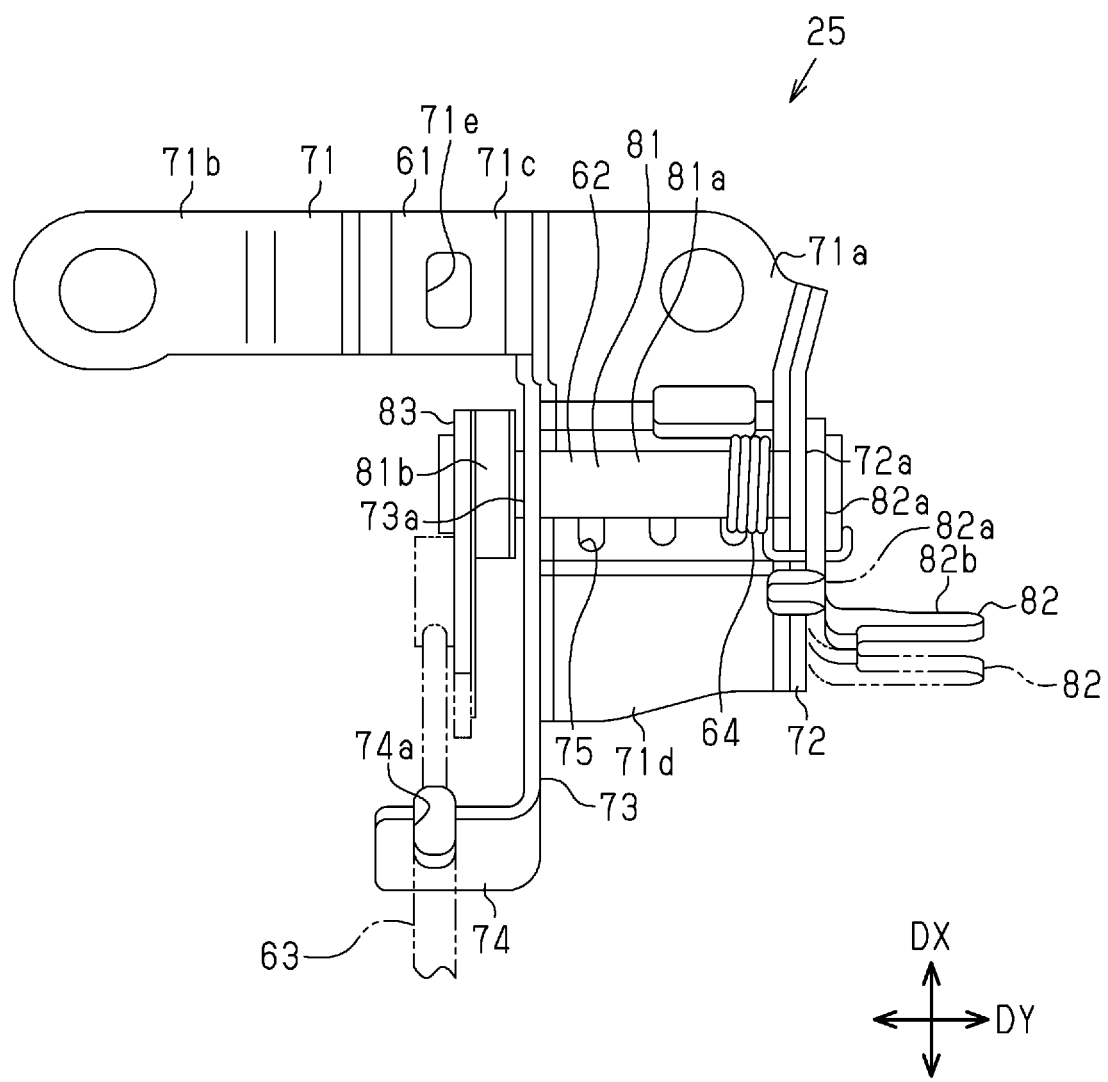
FIG. 7 is a plan view of the rear release mechanism without the cover.

As shown in FIG. 7, the first support wall 72 includes a first support hole 72a. The second support wall 73 projects substantially upward from a rear end of the extension portion 71d in the front-rear direction DY. The second support wall 73 includes a second support hole 73a.

As shown in FIG. 6, the second support wall 73 includes a first opening 73b that is engaged with a first engagement portion of the cover 26, which will be described later.

The holding wall 74 projects rearward in the front-rear direction DY from the second support wall 73 at a position substantially separated from the second support hole 73a in the widthwise direction DX. The holding wall 74 includes a holding groove 74a. The holding groove 74a is a cutout extending substantially downward from an upper end of the holding wall 74 in the top-bottom direction DZ.

The open shaft 62 includes a shaft member 81, a release lever 82, and an input lever 83. The release lever 82 may be referred to as a release portion.

The shaft member 81 includes a shaft 81a and a flange 81b. The shaft 81a is formed integrally with the flange 81b. Alternatively, the shaft 81a and the flange 81b may be separate parts.

As shown in FIG. 7, the shaft 81a extends substantially straight in the front-rear direction DY and is inserted through the first support hole 72a and the second support hole 73a. In this manner, the first support wall 72 and the second support wall 73 support the open shaft 62 rotatably about a second rotation center.

The second rotation center is the hypothetical center axis of the shaft 81a and extends between the two ends of the shaft 81a. The second rotation center extends in the front-rear direction DY. In the present embodiment, the second rotation center extends in the front-rear direction DY.

As shown in FIG. 3, in the present embodiment, extensions of the second rotation center and the first rotation center lie along the same axis. Accordingly, the second rotation center is parallel to the first rotation center.

The release lever 82 is located in front of the first support wall 72 and connected to a front end of the shaft member 81.

As shown in FIG. 6, the release lever 82 includes a base portion 82a, a contact portion 82b, and a stopper 82c. The base portion 82a projects from the shaft member 81 in a radial direction of the second rotation center. The contact portion 82b projects substantially toward the front from the base portion 82a at a position separated from the second rotation center in the radial direction of the second rotation center. The stopper 82c projects substantially rearward from the base portion 82a at a position closer to the second rotation center than the contact portion 82b.

As shown in FIG. 7, the input lever 83 is located rearward from the second support wall 73 and connected to a rear end of the shaft member 81.

The shaft member 81 is connected to the release lever 82 and the input lever 83 in a manner integrally rotatable about the second rotation center.

As shown in FIG. 4, the rear bent portion 42c of the open rod 42 is located above the contact portion 82b. When a strap (not shown in the drawing), which is operable from the rear of the seat 12, is pulled, the cable 63 connected to the strap pulls the input lever 83. The torque (operational force) input to the input lever 83 rotates the open shaft 62 about the second rotation center. This pivots the release lever 82 about the second rotation center so that the contact portion 82b approaches the rear bent portion 42c.

The contact portion 82b of the pivoting release lever 82 pushes the rear bent portion 42c of the open rod 42 upward and rotates the open rod 42 about the first rotation center. In accordance with the pivoting of the open rod 42, the lock lever 43 also pivots about the first rotation center from the lock position P1 to the unlock position P2. In this manner, the release lever 82 of the open shaft 62 rotates the open rod 42 to move the lock lever 43 to the unlock position P2. Thus, the rear release mechanism 25 unlocks and releases the upper rail 22 and the lower rail 21 from the lock mechanism 23 when the cable 63, which is operable from the rear of the seat 12, is operated.

The cover 26 will now be described.

Figure 8:
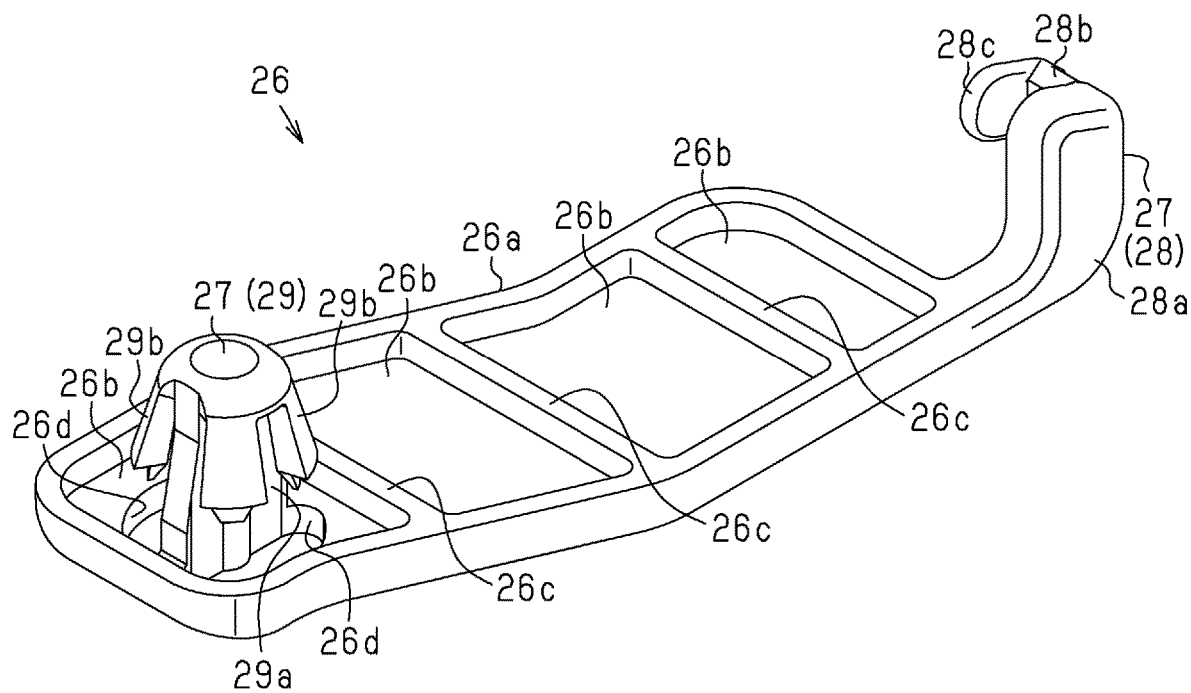
FIG. 8 is a perspective view showing a lower side of the cover.
Figure 9:
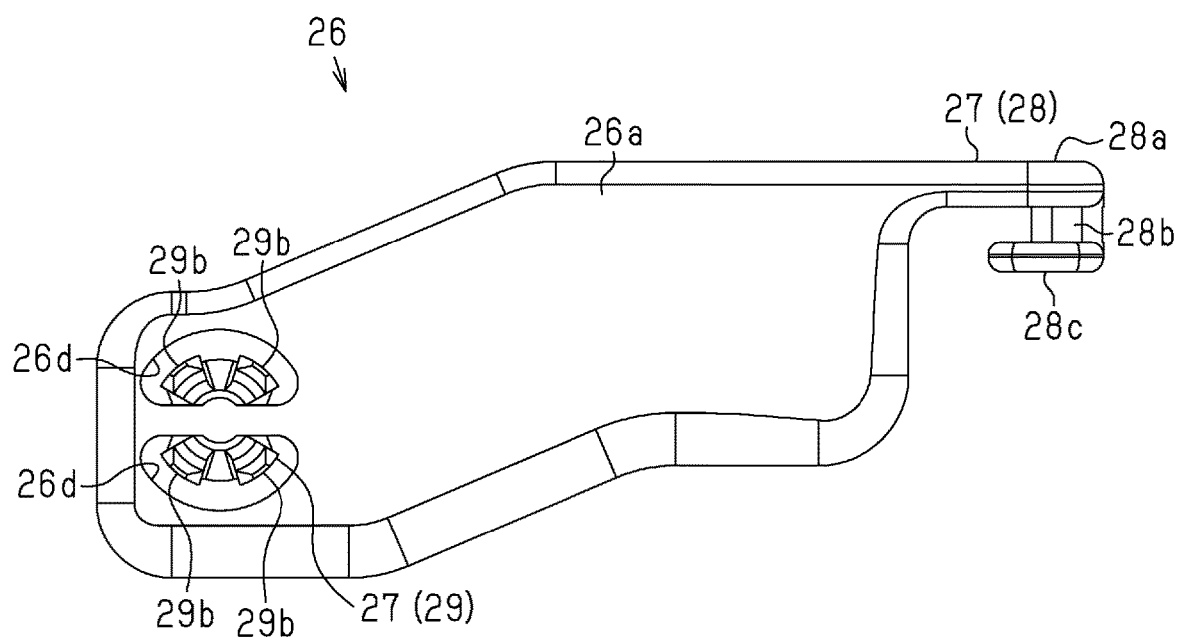
FIG. 9 is a plan view of the cover.
Figure 10:
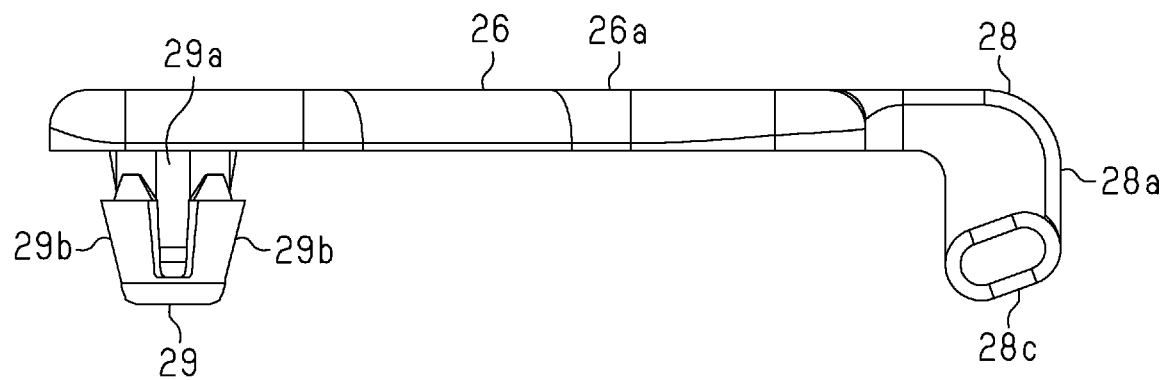
FIG. 10 is a side view of the cover.

As shown in FIGS. 8 to 10, the cover 26 includes a cover main body 26a and engagement portions 27. The cover main body 26a includes a pair of short sides and a pair of long sides. The engagement portions 27, which are located on the two ends of the cover main body 26a with respect to the direction in which the long sides extend, are engaged with the open shaft bracket 61.

The cover main body 26a will now be described.

As shown in FIG. 9, the two long sides of the cover main body 26a are slightly inclined in a transverse direction, which is parallel to the short sides, at central parts with respect to a longitudinal direction, which extend parallel to the long sides. In other words, the cover main body 26a is shaped so that the longitudinally central portions are shifted in the transverse direction. Accordingly, "rectangular plate including a pair of short sides and a pair of long sides" does not include only a rectangular shape but also includes a shape that is substantially rectangular in its entirety and may be partially inclined or curved. Further, "rectangular" includes a shape of which corners are curved.

As shown in FIG. 8, the lower side of the cover main body 26a includes a plurality of recesses 26b arranged next to one another in the longitudinal direction of the cover main body 26a. The recesses 26b are partitioned by a plurality of partition walls 26c extending in the transverse direction of the cover main body 26a. Each partition wall 26c is configured to have a height that is substantially equal to a thickness of the cover main body 26a.

The engagement portions 27 of the cover 26 will now be described.

As shown in FIG. 8, the engagement portions 27 include a first engagement portion 28, which is arranged at one end of the cover main body 26a in the longitudinal direction, and a second engagement portion 29, which is arranged at the other end of the cover main body 26a in the longitudinal direction. Specifically, the first engagement portion 28 is arranged at a position closer to one end of the cover main body 26a than the longitudinal center, and the second engagement portion 29 is arranged at a position closer to the other end of the cover main body 26a than the longitudinal center.

As shown in FIGS. 8 to 10, the first engagement portion 28 includes an arm 28a extending from one end of the cover main body 26a. Further, the first engagement portion 28 includes an insertion portion 28b and an engagement wall 28c. The insertion portion is arranged at a distal end of the arm 28a. The engagement wall 28c is arranged at an end of the insertion portion 28b located at the side opposite to the arm 28a. The insertion portion 28b is post-like and inserted in the first opening 73b of the open shaft bracket 61 as will be described later. The engagement wall 28c extends through the first opening 73b as will be described later. The arm 28a projects from the cover main body 26a in the longitudinal direction along a plate plane of the cover main body 26a and is bent toward the lower side of the cover main body 26a in a thickness-wise direction of the cover main body 26a.

Figure 11:
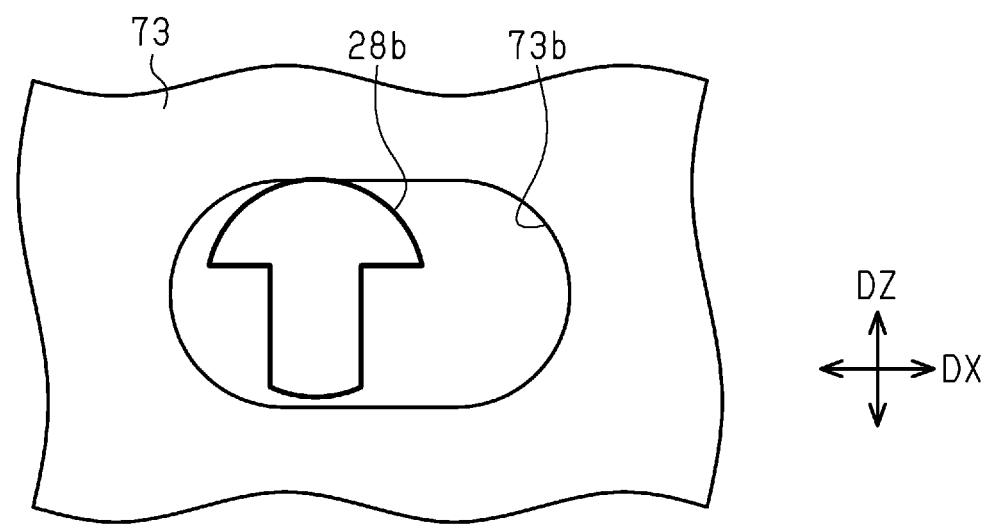
FIG. 11 is a cross-sectional view of a connecting portion.

As shown in FIG. 11, the insertion portion 28b is configured to have a T-shaped cross section. The insertion portion 28b is configured to have a length that is slightly greater than a thickness of the second support wall 73 of the open shaft bracket 61.

As shown in FIGS. 8 and 9, the engagement wall 28c is configured so that a plate plane of the engagement wall 28c is orthogonal to the plate plane of the cover main body 26a and to extend in the longitudinal direction of the cover main body 26a. The engagement wall 28c has a larger contour than the insertion portion 28b. Specifically, the contour of the engagement wall 28c is oval and substantially similar to and smaller than the shape of the first opening 73b in the open shaft bracket 61.

As shown in FIG. 10, a line segment connecting the end points of a major axis of the oval shape of the engagement wall 28c is inclined away from the plate plane of the cover main body 26a as the line segment becomes closer to the cover main body 26a in the longitudinal direction of the cover main body 26a. In other words, an imaginary line continuing along the major axis of the oval shape extends diagonally intersecting the plate plane of the cover main body 26a.

As shown in FIGS. 8 to 10, the second engagement portion 29 includes a boss 29a and clips 29b. The boss 29a is post-like and projects from the other end of the cover main body 26a in the thickness-wise direction of the cover main body 26a. The clips 29b are arranged on a distal end of the boss 29a. The boss 29a projects from the lower side of the cover main body 26a in the thickness-wise direction of the cover main body 26a. Four clips 29b are arranged on the distal end of the boss 29a. Specifically, the four clips 29b are arranged on the distal end of the boss 29a substantially concentrically about a shaft center of the boss 29a.

Each clip 29b includes a basal end connected to the boss 29a, and each clip 29b extends from the basal end toward the cover main body 26a. Each clip 29b is configured to gradually widen toward the cover main body 26a. As shown in FIG. 10, the four clips 29b are configured to be substantially trapezoidal as a whole in a sideview of the second engagement portion 29.

As shown in FIGS. 8 and 9, each clip 29b is spaced apart from an outer circumferential surface of the boss 29a by a predetermined distance. That is, a predetermined gap is formed between the distal end of each clip 29b and the boss 29a. This gap allows the clips 29b to elastically deform in the radial direction of the boss 29a. A hypothetical circle that contacts an outer surface of the four clips 29b has a slightly larger diameter than a hypothetical circle circumscribing the second opening 71e in the projection 71c of the coupling wall 71 of the open shaft bracket 61. Further, when the four clips 29b are elastically deformed, the diameter of the hypothetical circle of the clips 29b will be smaller than the diameter of hypothetical circle circumscribing the second opening 71e.

As shown in FIGS. 8 to 10, the cover main body 26a includes through holes 26d at two sides of the boss 29a in the transverse direction. The through holes 26d extend through the cover main body 26a in the thickness-wise direction. The arrangement of the through holes 26d allow the clips 29b to be visible from the side of the upper surface of the cover main body 26a (side upward from plane of FIG. 9).

The material for the cover 26 is not particularly limited. For example, a resin, polymer, or metal may be employed as the material for the cover 26. A resin is preferred as the material for the cover 26 for its light weight and superior durability.

A method for attaching the cover 26 will now be described.

Figure 12A:
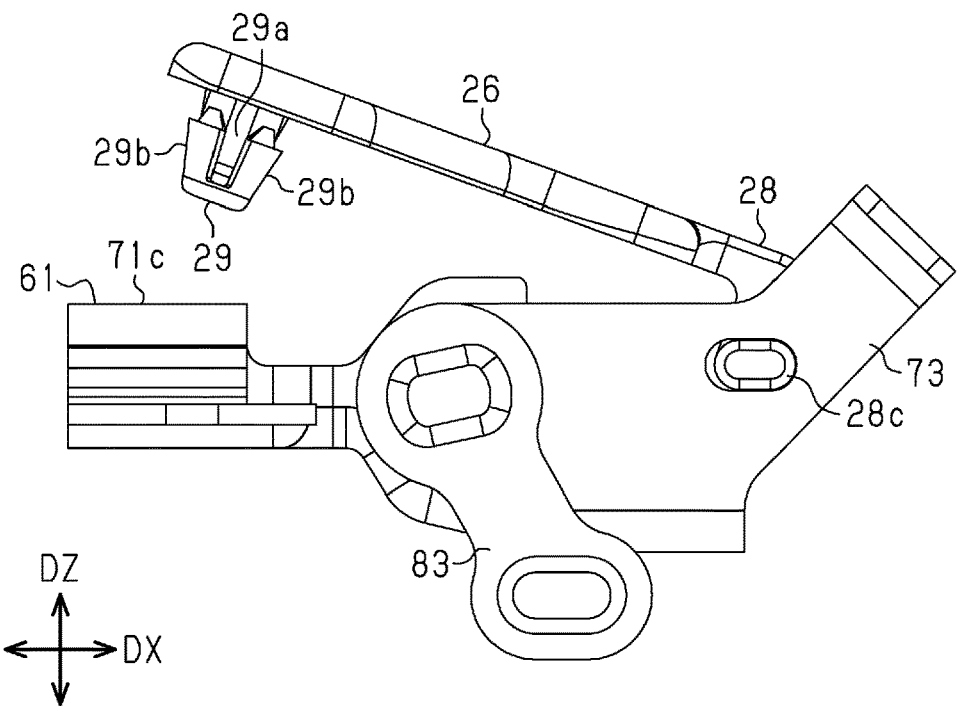
FIG. 12A is a schematic diagram showing a state in which the cover is being attached.

As shown in FIG. 12A, the first engagement portion 28 of the cover 26 is inserted into the first opening 73b in the second support wall 73 of the open shaft bracket 61. Specifically, the engagement wall 28c and the insertion portion 28b of the first engagement portion 28 are inserted in the first opening 73b. Further, the engagement wall 28c is extended through the first opening 73b so that the insertion portion 28b is located inside the first opening 73b.

Figure 12B:
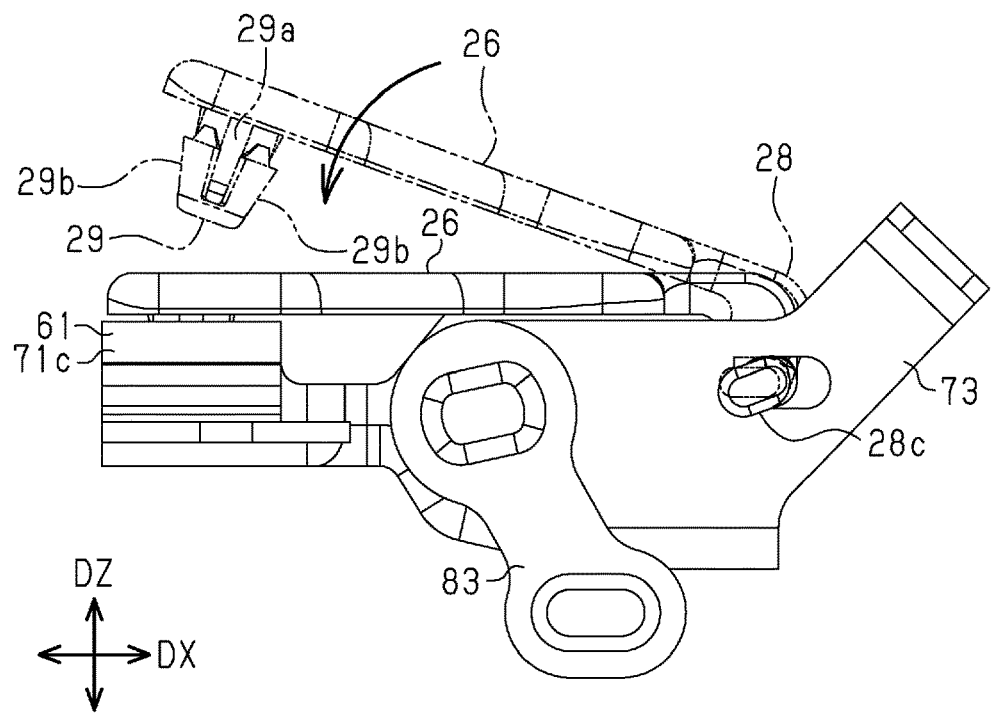
FIG. 12B is a schematic diagram showing a state after the cover is attached.

As indicated by the arrow in FIG. 12B, the cover 26 is rotated about the insertion portion 28b, which is located inside the first opening 73b, to engage the second engagement portion 29 of the cover 26 with the second opening 71e in the coupling wall 71 of the open shaft bracket 61. Specifically, the four clips 29b of the second engagement portion 29 are inserted in the second opening 71e. The four clips 29b are inserted in the second opening 71e in a state in which the diameter of the four clips 29b is decreased in the radial direction of the boss 29a. Then, the diameter is increased when extended out of the second opening 71e. The distal ends of the clips 29b contact the lower side of the coupling wall 71 to prevent separation of the clips 29b from the second opening 71e in an insertion direction. In this manner, the second engagement portion 29 is engaged with the open shaft bracket 61. The second engagement portion 29 is engaged with the open shaft bracket 61 through snap-fitting.

As shown in FIG. 12B, when engaging the second engagement portion 29 with the second opening 71e, the insertion portion 28b of the first engagement portion 28 is also rotated in a circumferential direction. Thus, a direction in which a long side of the oval shape of the engagement wall 28c of the first engagement portion 28 is directed intersects with a direction in which a long side of the oval shape of the first opening 73b of the second support wall 73 is directed. Thus, the engagement wall 28c overlaps with the wall around the first opening 73b. This prevents separation of the engagement wall 28c from the first opening 73b in the insertion direction. Thus, the first engagement portion 28 is kept engaged with the open shaft bracket 61.

The above-described method attaches the cover 26 to the open shaft bracket 61. When the cover 26 is attached, the cover 26 covers the input lever 83 of the rear release mechanism 25 from the above. The cover 26 does not have to cover the entire rear release mechanism 25 and may be attached to cover at least part of the rear release mechanism 25.

Figure 13:
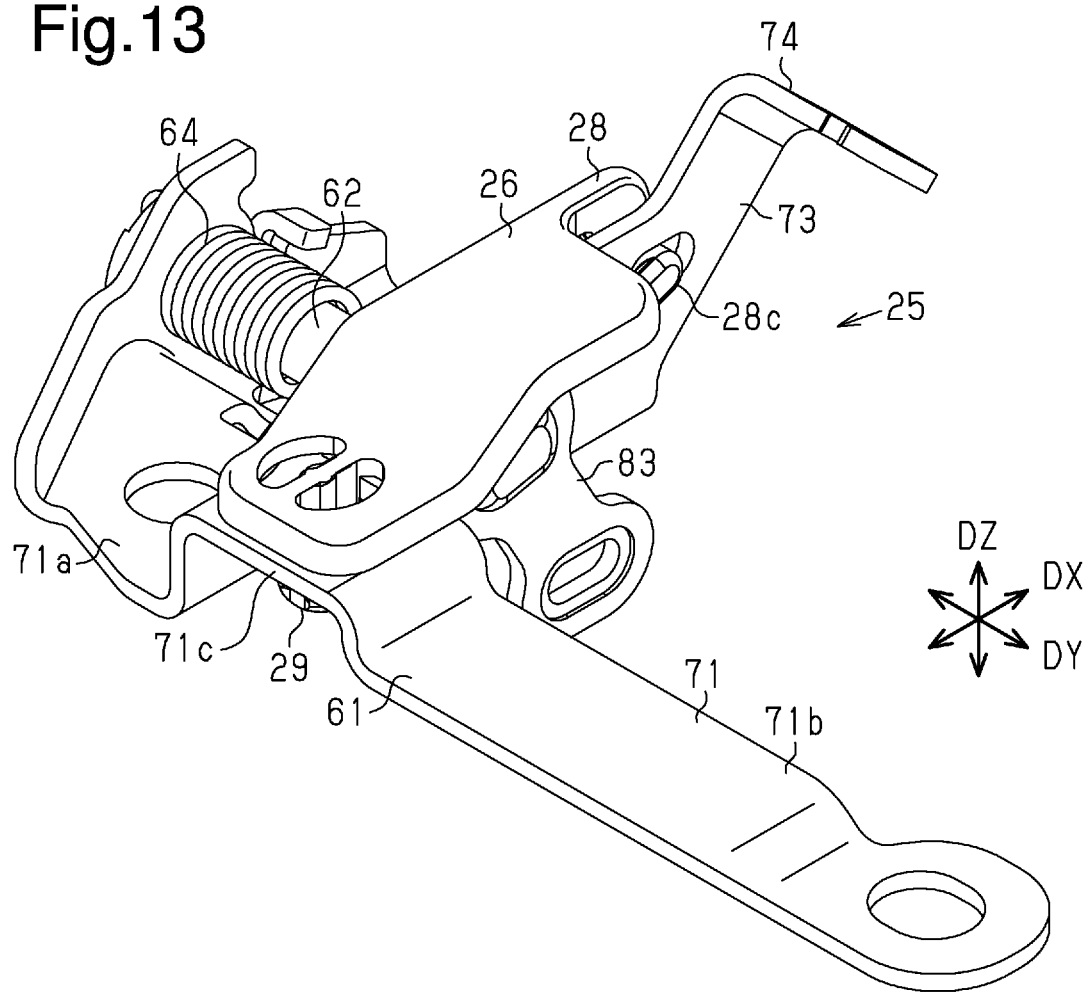
FIG. 13 is a perspective view of the rear release mechanism after the cover attached.

As shown in FIG. 13, the first engagement portion 28 is coupled to the open shaft bracket 61 in the front-rear direction DY, and the second engagement portion 29 is coupled to the open shaft bracket 61 in the top-bottom direction DZ. Thus, the first engagement portion 28 and the second engagement portion 29 are coupled to the open shaft bracket 61 in different directions.

Further, the clips 29b of the second engagement portion 29, which are in contact with the coupling wall 71 of the lower side of the open shaft bracket 61, are visible through the through holes 26d arranged in the cover main body 26a.

The operation and advantages of the present embodiment will now be described.

(1) The slide device 10 includes the lower rail 21, the upper rail 22, the lock mechanism 23, the front release mechanism 24, and the rear release mechanism 25. The upper rail 22 is movably coupled to the lower rail 21. The lock mechanism 23 is configured to restrict movement of the upper rail 22 relative to the lower rail 21. The front release mechanism 24 and the rear release mechanism 25 are configured to release a lock of the lock mechanism 23. The rear release mechanism 25 includes the open shaft bracket 61 fixed onto the upper rail 22. The cover 26 is attached to the open shaft bracket 61.

The cover 26 is attached to the open shaft bracket 61, which is fixed onto the upper rail 22. This prevents a member from coming into contact with the rear release mechanism 25. Thus, the lock release member is readily protected in a preferred manner. This also protects a member that would otherwise come into contact with the rear release mechanism 25. Such a member is, for example, a belt anchor. Also, the cover 26 is stably attached to the open shaft bracket 61 because the open shaft bracket 61 is fixed to the upper rail 22.

(2) The cover 26 includes the cover main body 26a and the engagement portions 27. The cover main body 26a has a pair of short sides and a pair of long sides. The engagement portions 27 are engaged with the open shaft bracket 61 at the two longitudinal ends of the cover main body 26a. The cover main body 26a protects the cover 26, and the engagement portions 27 engage with the open shaft bracket 61. In this manner, the engagement portions 27 more stably attach the cover 26 at two ends while the cover main body 26a covers the rear release mechanism 25 in a preferred manner.

(3) The engagement portions 27 include the first engagement portion 28, which is located at one longitudinal end of the cover main body 26a, and the second engagement portion 29, which is located at the other longitudinal end of the cover main body 26a. The first engagement portion 28 and the second engagement portion 29 are coupled to the open shaft bracket 61 in different directions. Therefore, the cover 26 is less likely to be separated compared to a configuration in which the first engagement portion 28 and the second engagement portion 29 are coupled to the open shaft bracket 61 in the same direction.

(4) The insertion portion 28b of the first engagement portion 28 of the cover 26 is configured to have a T-shaped cross section. Therefore, the insertion portion 28b has a higher strength and is reduced in weight compared to a configuration in which the insertion portion 28b is circular or rectangular.

(5) The through holes 26d arranged in the cover main body 26a allow the clips 29b to visible from the upper surface side of the cover main body 26a. Accordingly, the clips 29b of the second engagement portion 29, which are in contact with the lower side of the coupling wall 71 of the open shaft bracket 61, are visible. The attachment of the second engagement portion 29 to the open shaft bracket 61 can easily be checked from the front surface side of the cover main body 26a. This increases efficiency when attaching the cover 26. Moreover, the attachment of the first engagement portion 28 of the cover main body 26a to the open shaft bracket 61 is visible from the front surface side of the cover main body 26a. Thus, the engagement of the first engagement portion 28 and the engagement of the second engagement portion 29 can be visually checked from a single side, namely the upper surface side of the cover main body 26a. This further increases efficiency when attaching the cover 26.

Other Embodiments

The present embodiment may be modified as follows. The present embodiment and the following modifications can be combined as long as the combined modifications remain technically consistent with each other.

In the present embodiment, the two long sides of the cover main body 26a are slightly inclined in the transverse direction, which is parallel to the short sides, at the central parts with respect to the direction parallel to the long sides. However, the cover main body 26a is not limited to this configuration. Specifically, the cover main body 26a may be rectangular and have two long sides that are not inclined in the transverse direction, which is parallel to the short sides. The cover main body 26a may have the shape of a polygon other than a rectangle. Alternatively, the cover main body 26a may be circular, elliptic, oval, or the like.

In the present embodiment, the cover 26 is attached to the rear release mechanism 25. Instead, the cover 26 may be attached to the front release mechanism 24 or attached to both of the front release mechanism 24 and the rear release mechanism 25. When the cover 26 is attached to the front release mechanism 24, the front release mechanism 24 is protected in a preferred manner. A member of the front release mechanism 24 to which the cover 26 is attached is, for example, the open lever bracket 51.

In the present embodiment, the cover 26 is attached to the open shaft bracket 61 of the rear release mechanism 25. Instead, the cover 26 may be attached to a member of the rear release mechanism 25 other than the open shaft bracket 61. The member other than the open shaft bracket 61 is, for example, the open shaft 62. Further, in a configuration in which the cover 26 is attached to the front release mechanism 24, the member to which the cover 26 is attached is not limited to the open lever bracket 51. For example, the cover 26 may be attached to the open rod 42.

In the present embodiment, the cover 26 is attached by engaging the open shaft bracket 61. The cover 26 may be attached without engaging the open shaft bracket 61. In a configuration in which the cover 26 is attached without engaging the open shaft bracket 61, for example, the cover 26 is connected to the open shaft bracket 61 by an adhesive. Also, for example, the cover 26 may be fixed by a nut or the like to the rear bolt 32 or the like arranged on the upper wall 22a of the upper rail 22 so that the cover 26 is attached at a position where the cover 26 covers the open shaft bracket 61.

The shape of the engagement wall 28c of the first engagement portion 28 of the cover 26 is not limited to an oval shape. The shape of the engagement wall 28c may be a shape that overlaps with the wall around the first opening 73b arranged in the second support wall 73 of the open shaft bracket 61 and prevents separation of the engagement wall 28c from the first opening 73b in the insertion direction.

The number of the clips 29b of the second engagement portion 29 of the cover 26 is not limited to four. The number of the clips 29b may be less than or equal to three or greater than or equal to five. The shape of the clip 29b may be a shape that prevents separation of the second engagement portion 29 from the second opening 71e in the insertion direction.

In the present embodiment, only the second engagement portion 29 is configured to be engaged through snap-fitting, but the first engagement portion 28 and the second engagement portion 29 may also be engaged through snap-fitting.

In the present embodiment, the first engagement portion 28 and the second engagement portion 29 are coupled to the open shaft bracket 61 in different directions. Instead, the first engagement portion 28 and the second engagement portion 29 may be coupled to the open shaft bracket 61 in the same direction. For example, when a second opening is arranged in a side surface of the projection 71c of the coupling wall 71 of the open shaft bracket 61 to engage with the second engagement portion 29, the first engagement portion 28 and the second engagement portion 29 are coupled to the open shaft bracket 61 in the same direction, namely the widthwise direction DX.

In the present embodiment, the cover 26 is attached to the open shaft bracket 61 at an upper side with respect to the top-bottom direction DZ. Instead, the cover 26 may be attached to the open shaft bracket 61 at one side with respect to the front-rear direction DY or one side with respect to the widthwise direction DX. This protects the rear release mechanism 25 in a preferred manner at the side in the front-rear direction DY or the widthwise direction DX.

In the present embodiment, the engagement portions 27 include the first engagement portion 28, which is arranged at one longitudinal end of the cover main body 26a, and the second engagement portion 29, which is arranged at the other longitudinal end of the cover main body 26a. Instead, the engagement portions 27 may be configured by only one of the first engagement portion 28 and the second engagement portion 29.

A cover may be attached to the lock mechanism 23 serving as the lock member.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A slide device, comprising:
a lower rail;
an upper rail coupled to a lower rail in a movable manner;
a lock member that restricts movement of the upper rail relative to the lower rail; and
a lock release member that releases a lock of the lock member, wherein
the lock release member includes a bracket fixed to the upper rail,
a cover is attached to the bracket, and
the cover includes a cover main body, which is a rectangular plate having a pair of short sides and a pair of long sides, and an engagement portion, which is engaged with the bracket at two ends of the cover main body in a direction parallel to the long sides.

2. The slide device according to claim 1, wherein
the engagement portion includes a first engagement portion, which is located at one end of the cover main body in the direction parallel to the long sides, and a second engagement portion, which is located at another end of the cover main body in the direction parallel to the long sides, and
the first engagement portion and the second engagement portion are coupled to the bracket in different directions.

* * * * *